Dec. 30, 1969  K. F. LUFT  3,486,364
OXYGEN DETERMINATION
Filed March 6, 1967  2 Sheets-Sheet 1

INVENTOR
Karl Friedrich Luft
by Fraser, Wilson, & Fraser
attorneys

Dec. 30, 1969   K. F. LUFT   3,486,364
OXYGEN DETERMINATION

Filed March 6, 1967   2 Sheets-Sheet 2

INVENTOR
Karl Friedrich Luft
by Fraser, Wilcox & Fraser
attorneys ns
3,486,364
OXYGEN DETERMINATION Karl Friedrich Luft, Essen-Kray, Germany, assignor to Bergwerksverband GmbH, Essen, Germany, a German company
Filed Mar. 6, 1967, Ser. No. 620,727
Int. Cl. G01n 31/00
U.S. Cl. 73—27                3 Claims

ABSTRACT OF THE DISCLOSURE

The specification describes an improved gas flow measuring system for use in portable apparatus for determining oxygen in gas mixtures using its paramagnetism. In the flow measuring system two electrically heated resistors forming the two halves of a bridge circuit are placed in the two limbs of a U-tube through which the gas flows cooling the resistances and upsetting the bridge balance. The placing of both halves of the bridge in the gas flow increases sensitivity, while the use of a U-tube prevents acceleration effects, due for example to lifting the apparatus, from disturbing the bridge balance.

---

Figure 1:
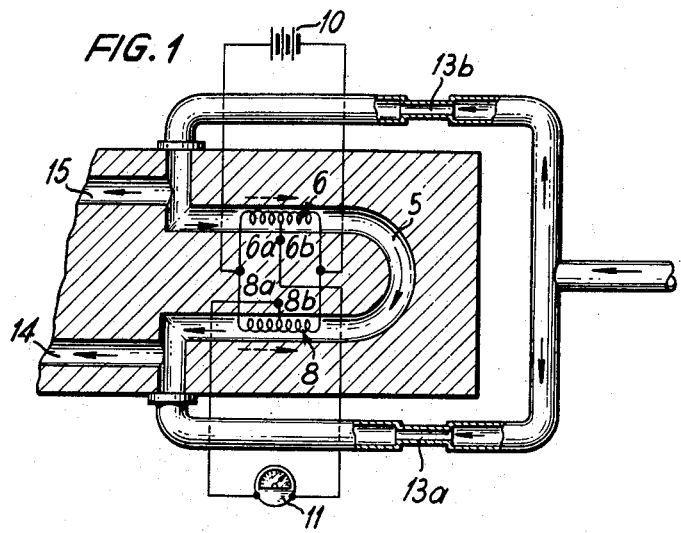

The present invention relates to portable apparatus for determining the oxygen content of a gas.

The British patent specification No. 1,040,707 and the corresponding U.S. specification No. 3,287,959 both described a portable form of such an apparatus using the effect of a non-homogeneous part of a magnetic field on the flow characteristics of the gas. As described in these specifications, the apparatus comprises a symmertrical bridge circuit outside the magnetic field, for measuring a gas flow produced in part of a gas flow system by a differential pressure arising from the magnetic effect, the bridge circuit including two like thermal flow-measuring means, one of which is arranged in a first channel and the other in a second channel, the channels being so arranged as to compensate for the influence of lift and acceleration.

One object of the invention is to provide a form of the apparatus described in the above specifications having an enhanced accuracy without losing any of the advantages of the earlier forms of apparatus.

In accordance with the present invention the apparatus comprises first and second resistances respectively forming the two like thermal flow measuring means, an electrical measuring instrument which is connected with the resistances to form a bridge circuit whose balance state depends on the temperature conditions of the resistances, the first and second channels, in which the first and second resistances are respectively placed being, substantially parallel, connecting duct means joining adjacent ends of the channels so as to define a generally U-shaped gas flow path leading from the first resistance to the second one, the length of the u-shaped flow path being sufficient to ensure cooling of the gas flowing from one resistance to the other. When constructing apparatus in accordance with the present invention it is a comparatively simple matter, requiring only one or two simple tests, to determine the correct length of the flow path between the resistances in order to ensure cooling of gas flowing from the first resistance to the other.

Since both resistances in the bridge are exposed to the gas flow, the reading obtained with the measuring instrument is twice as great as it would be with the apparatus described in the above-mentioned British and United States specifications. This is because the gas flow first exerts a cooling effect on the upstream portion of the first resistance and then after being cooled in the U-shaped flow path between the two channels, will exert a similar cooling effect on the upstream portion of the second resistance. The latter is connected diagonally opposite to the upstream portion of the first resistance in the bridge circuit. As can be shown by experiments and by theoretical considerations taking the low flow velocities and small duct diameters into account, the distance of the one resistance from the other along the U-shaped flow path can be under approximately one centimeter.

Thus, despite the doubling of the response of the instrument as compared with the apparatus described in the earlier specifications, there is no increase in the size of the apparatus.

With apparatus in accordance with the present invention, lift and acceleration effects are cancelled out because they act in the same direction on both the channels with the resistances in them and therefore, if any gas movement is caused in the channels it will be in the same direction and therefore lead to an identical cooling of the corresponding parts of the two resistances. For instance, if gas flow were caused towards the U-shaped connecting path between the resistances, the upstream portion of the first resistance and the downstream part of the second resistance would be cooled, but since they represent conjugate limbs of the bridge circuit, the balance of the latter would be left unaffected.

It has been found in the manufacture of apparatus in accordance with the invention that despite the greatest care being taken in mounting the resistances in their channels, it is difficult to achieve the required equal response of the two halves of the bridge, that is to say the two resistances, to gas flow. Therefore, in accordance with a preferred feature of the invention, the apparatus comprises two duct loops which are connected respectively with the two channels so as to form gas flow paths extending respectively from a point upstream from the resistance in the respective channel to a point downstream from it, adjustable choke means, such as screws, being provided in the two loops. The adjustment of the choke means may be used to remove any residual sources of error due to lift and acceleration.

In order to increase the sensitivity of the apparatus in accordance with the invention, it is possible to provide more than two such channels which are connected together by such connecting ducts so as to form a generally zig-zag duct structure with parallel channels, such a resistance being mounted in each channel, and the measuring instrument being connected so as to be responsive to the temperature conditions in all the resistances.

A form of the apparatus in accordance with the last preceding paragraph may of course include the duct loops with adjustable choke means in order to ensure a complete removal of lift and acceleration effects upon the measuring instrument.

Three embodiments of the invention are now described with reference to attached drawings. All the figures of the drawing are purely diagrammatic and only show part of the apparatus, since the omitted parts can be readily visualized on consulting the above-mentioned British and American specifications. Applicant incorporates in this application a portion of the disclosure in his prior U.S. Patent 3,287,959, dated Nov. 29, 1966 and in particular reference is made to FIGURES 3, 4 and 5 of that patent. In this connection, it will be observed that the ducts 14 and 15 correspond to the same numbered ducts in this application. Furthermore, the capillaries 13a and 13b are in common in the application and the disclosure in FIGURE 3 of the patent. Thus, the structure of FIGURES 3 and 4 are incorporated by reference in this application since the fundamental difference in this application is in respect of the U-shaped tube 5 and the arrangement of the resistors 6 and 8 in the parallel channels of the U tube structure.

FIG. 1 shows a first embodiment of the invention in which resistances 6 and 8 are placed in two parallel channels forming part of a U-shaped duct 5.

Figure 2:
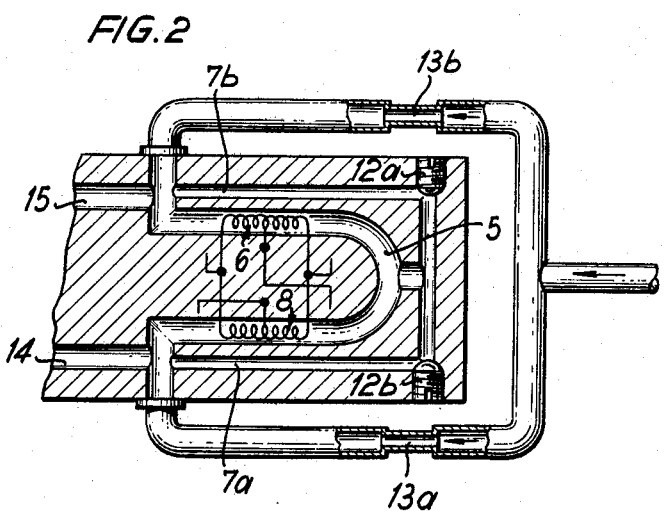
Figure 3:
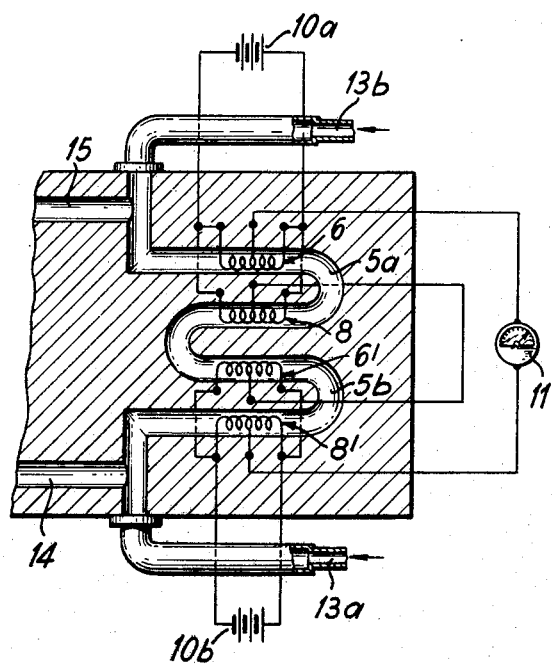

FIGS. 2 and 3 show further embodiments of the invention.

In all the embodiments of the invention a comparison gas flows from the right through capillaries 13b and 13a to outlets ducts 14 and 15 leading to a magnetic field. Owing two different oxygen contents in the comparison gas, the latter flows along the U-shaped tube 5 as indicated by the arrow in FIG. 1. The U-shaped tube 5 comprises two parallel channels in which resistances 6 and 8 are mounted. The two right-hand adjacent ends of the channels are connected by the semi-circular part of the tube 5 so as to form a connecting duct defining a generally U-shaped path leading from resistance 6 to resistance 8. Each resistance 6 and 8 has a center tap and an electrical measuring instrument 11 is connected between the two center taps: the two halves of resistance 6, that is to say 6a and 6b, and the two halves 8a and 8b form the four arms or limbs of a bridge circuit. A battery 10 is connected across the junctions between resistances 6a and 8a, on the one hand, and between 6b and 8b, on the other. In operation a flow of gas along the U tube 5 first cools the resistance 6a and then, after being cooled during its passage along the U-shaped path between the two resistances, the gas cools the upstream half 8b of resistance 8. As has already been mentioned, the U-shaped path between the two resistances need only be comparatively short, for instance under one centimeter, in order to achieve the required cooling of the gas. In any case the determination of a sufficient length for the connecting path can easily be carried out by those skilled in the art with one or two tests.

Since the two resistance halves 6a and 8b are cooled to the same degree and change their electrical resistance in the same manner, and furthermore, since they form two diagonally opposite limbs of the bridge circuit, the signal fed to the measuring instrument 11 is twice that which it would be if only one of the resistances were placed in the gas flow. Since the channels in which the resistances 6 and 8 are placed are parallel, the effect of lift or acceleration, if any, will be to tend to force the gas to flow along both channels of the U tube 5 in the same direction, for instance as indicated by the arrows given in broken lines in FIG. 1. If there is any gas movement in this direction, the cooling effect will be exerted on the two conjugate-bridge limbs or arms constituted by resistance halves 6a and 8a so that the balance of the bridge will not be disturbed and no misleading signal will be given by the instrument 11.

In order to remove any errors due to inaccuracy in the manufacture of the resistances 6 and 8 and their mounting in the channels, the form of the apparatus shown in FIG. 1 may be modified as shown in FIG. 2. In this embodiment of the invention duct loops 7b and 7a are connected respectively with the two channels of the U tube 5 so as to form gas flow paths extending respectively from a point upstream of the resistance in the respective channel to a point downstream from it. In order to adjust the resistance of the loops 7b and 7a to gas flow, adjustable choke means in the form of screws 12a and 12b are provided.

Thus if, for example, resistance 6 responds to a given gas flow more than resistance 8, the screw 12b is closed while screws 12a is opened. Owing to the reduction in the resistance to gas flow in the duct loop 7b, the effect of the gas flow on resistance 8 is increased so that both resistances 6 and 8 respond to the same extent.

The embodiment of the invention shown in FIG. 3 can be considered to have two U-shaped tubes 5 as shown in FIG. 1 (indicated in FIG. 3 by reference numerals 5a and 5b) so as to form four channels in a generally zig-zag duct structure. Each U tube 5a and 5b has a pair of resistances, 6, 8 and 6', 8' respectively, to form two bridges. Batteries 10a and 10b are connected at the junctions between the adjacent ends of the resistances 6, 8 and 6', 8' respectively, while the instrument 11 is connected to the center taps of the two resistances 6 and 8'. The center taps of the resistances 6' and 8 are connected together by a wire. In consequence of the manner in which the bridge circuits are connected together, the signal which the instrument 11 receives in response to a given gas flow is double that which it would receive if it were connected to one of the bridges only instead of being connected to both of them.

Naturally various changes can be made in the embodiments of the invention described. Thus, for instance, the principles of FIGS. 2 and 3 could be combined so that each limb of the two U tubes 5a and 5b shown in FIG. 3 would have a loop such as 7a or 7b connected so as to provide a shunt or bypass across the respective resistance for trimming the gas flow along the channel in which the resistance is placed.

I claim:

1. In a measuring apparatus for determining the oxygen content of a gas, a single duct inlet for the comparison gas, flow dividing means whereby the gas stream in said duct is divided, two parallel ducts each leading from said flow dividing means, a U-shaped duct having its ends connected respectively to said parallel ducts, a symmetrical bridge circuit including first and second resistors forming two like measuring means arranged respectively in the arms of said U-shaped duct, an electrical measuring instrument connected with said resistors to form a bridge circuit whose balance state depends on the temperature conditions of said resistors, and an outlet duct communicating with each arm of said U-shaped duct and leading to a magnetic field.

2. Apparatus as claimed in claim 1, comprising channels on the sides respectively of said U-shaped duct and communicating respectively with opposite ends thereof to form gas flow paths respectively from a point upstream of each resistor to a point downstream thereof, and adjustable choke means for each channel.

3. Apparatus as claimed in claim 1, comprising an additional U-shaped duct connected to said first U-shaped duct to form a zig-zag duct structure and interposed between said outlet ducts, similar resistors in said additional U-shaped duct, and measuring instrument being connected to be responsive to the temperature conditions of all resistors.

References Cited

UNITED STATES PATENTS

| 2,903,883 | 9/1959 | Luft | 73—27 |
| 3,287,959 | 12/1966 | Luft | 73—27 |

RICHARD C. QUEISSER, Primary Examiner

J. K. LUNSFORD, Assistant Examiner